Jan. 29, 1963   F. S. PEARNE   3,075,656
RACK LOADING APPARATUS
Filed Feb. 25, 1960   9 Sheets-Sheet 2

INVENTOR
*Frank S. Pearne*
BY
ATTORNEYS

INVENTOR
Frank S. Pearne
BY Ely Pearne &
Gordon
ATTORNEYS

Jan. 29, 1963   F. S. PEARNE   3,075,656
RACK LOADING APPARATUS
Filed Feb. 25, 1960   9 Sheets-Sheet 9

INVENTOR
Frank S. Pearne
BY
ATTORNEYS

United States Patent Office 3,075,656
Patented Jan. 29, 1963

3,075,656
RACK LOADING APPARATUS
Frank S. Pearne, Los Angeles, Calif., assignor to Pearne and Lacy Machine Company, Inc., Los Angeles, Calif., a corporation of California
Filed Feb. 25, 1960, Ser. No. 10,903
11 Claims. (Cl. 214—16.4)

This invention relates to an apparatus for loading elongated cylindrical objects on receiving racks, and, more specifically, to an apparatus for positioning and arranging elongated cylindrical objects, such as pipe, on a receiving table, and for loading such pre-arranged objects into racks which are automatically positioned adjacent the table at predetermined intervals.

The invention is particularly concerned with machines for receiving extruded green clay sewer pipe which are serially discharged from a finishing machine, and for loading the green clay pipe into racks for a subsequent drying operation. The invention includes means for positioning and arranging a group of pipe sections in horizontal, spaced alignment on a pipe receiving table, and a pipe loading and elevating mechanism for picking up one such group after another and loading them in superposed rows within a pipe rack. The invention also includes a rack positioning mechanism for disposing an empty rack adjacent the pipe receiving table in a convenient position to be expeditiously loaded by the pipe loading and elevating mechanism, and for removing the loaded racks to a place where they may be taken to a drying kiln or the like.

The principal object of the invention is to provide a versatile pipe loading apparatus which is capable of loading pipe of various lengths and diameters.

Another more specific object is the provision of an apparatus for continuously receiving and positioning serially discharged green clay pipe in groups and for loading the groups of positioned pipe into superposed rows within a loading rack.

Still another object of the invention is the provision of a loading apparatus such as described in the previous paragraph including means for automatically handling the racks before and after loading to permit rapid and effective operation of the loading mechanism.

Other objects and attendant advantages of the invention will become apparent as the same become better understood when considered in connection with the following detailed description and the accompanying drawings wherein:

Figures 3, 4:
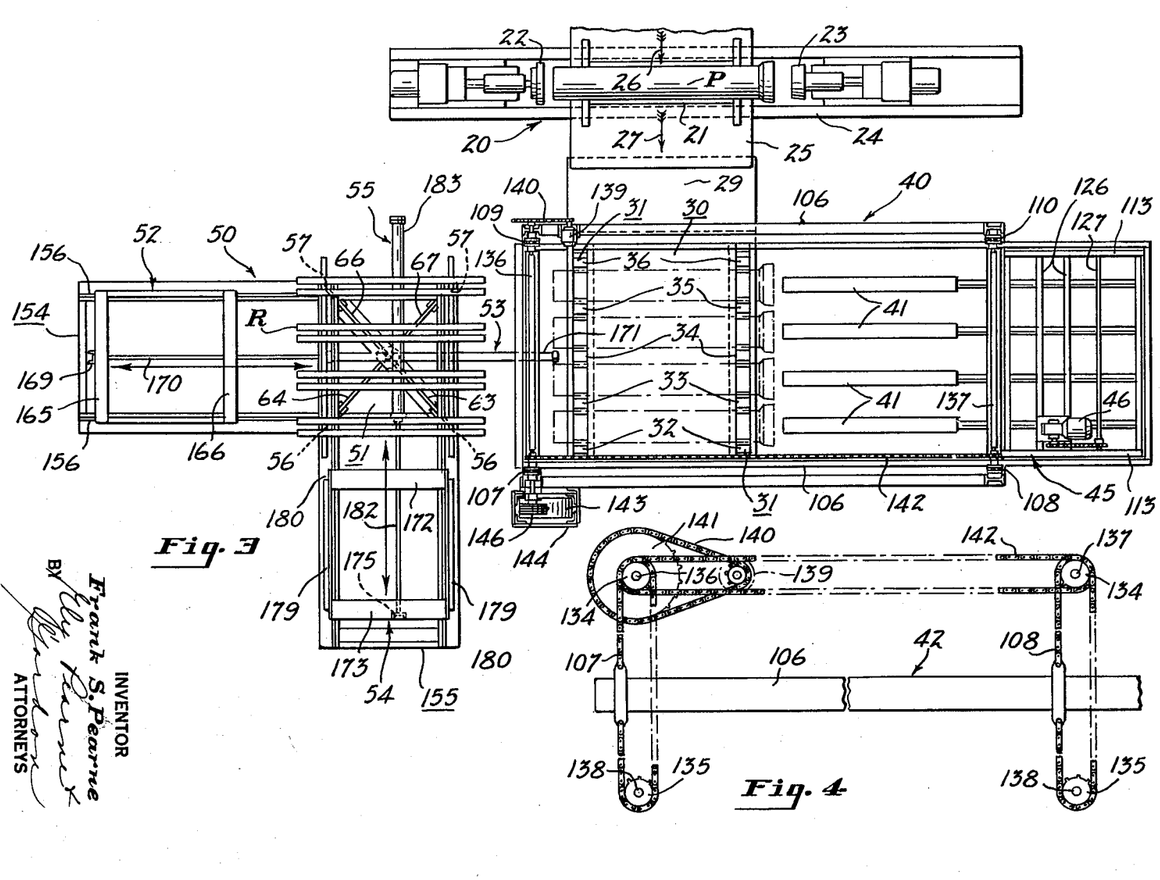
FIGURE 3 is a top plan view in the loading apparatus shown in FIG. 1, including a schematic view of an associated pipe finishing machine.
FIGURE 4 is a diagrammatic view showing the means for raising and lowering the carriage which forms a part of the invention.

The apparatus embodying the invention may be associated with any machine which horizontally discharges cylindrical objects at regular intervals by rolling them one after another onto and downwardly along an inclined surface. However, for the purposes of this disclosure, the invention is illustrated in association with a conventional, horizontal-type, finishing machine 20 for trimming and finishing both ends of green clay sewer pipe. The finishing machine 20 is schematically shown in FIG. 3 as being comprised of a tiltable cradle 21 for supporting a section P of green clay sewer pipe while the pipe ends are being trimmed and finished by rotary finishing tools 22 and 23 which are mounted for axial movement on the base 24. Pipe to be finished may be rolled along the tray 25 of the finishing machine in the direction of arrow 26 and into the cradle 21 which is tilted to receive the pipe section. The cradle is then returned to a level position for the finishing operation, and is subsequently tilted in the opposite direction to discharge the pipe section onto tray 25 for continued rolling motion in the direction indicated by arrow 27.

Figures 1, 2:
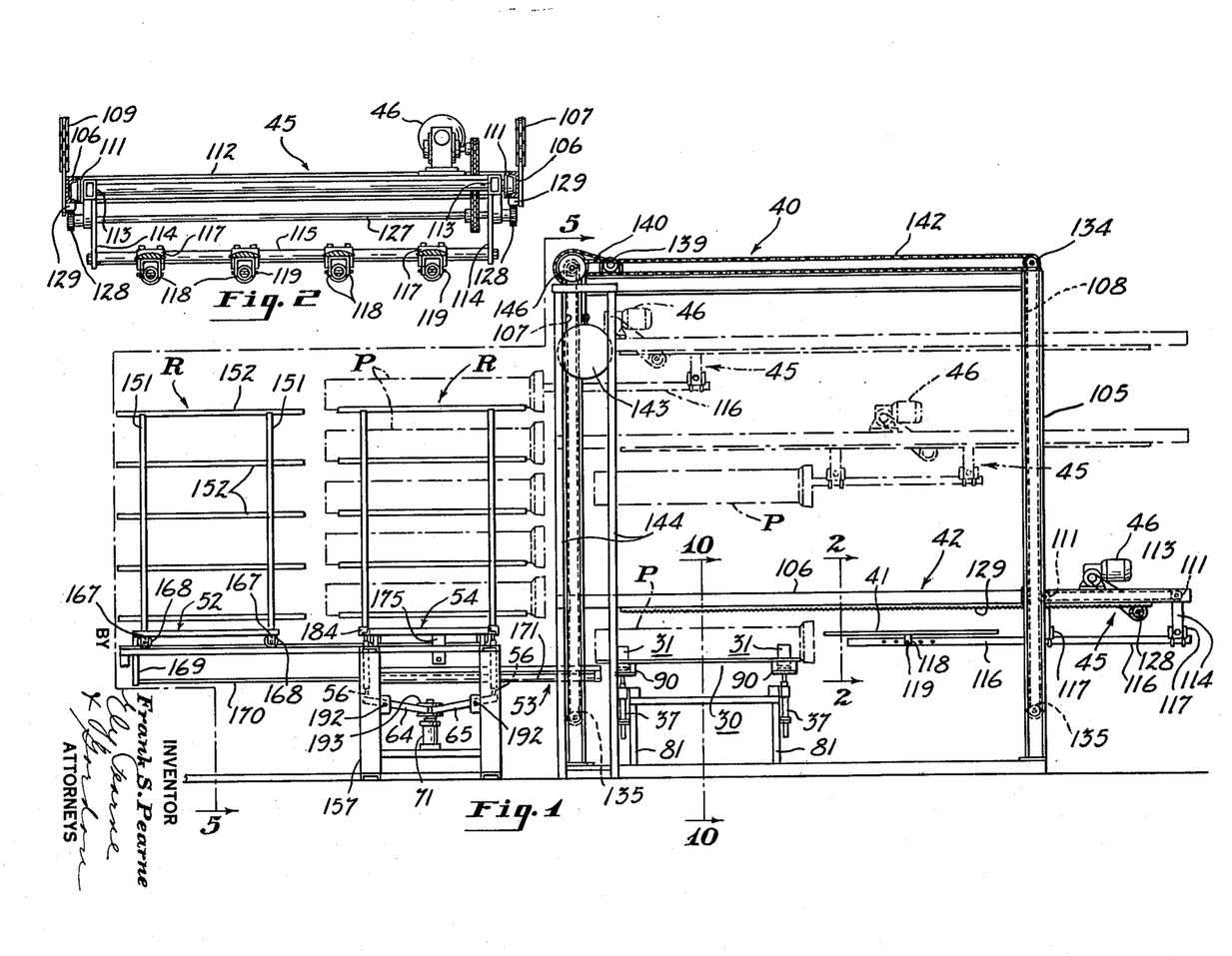
FIGURE 1 is a side elevation of one embodiment of the loading apparatus comprising the invention and showing the loading racks for receiving the pipe sections.
FIGURE 2 is a fragmentary vertical section of a portion of the apparatus taken along the line 2—2 of FIG. 1.

Pipe sections discharged from the finishing machine 20 are received from tray 25 onto ramp 29 from which the pipe sections roll onto a substantially horizontally disposed table 30 located within the framework of a pipe elevating and positioning mechanism 40 (FIGS. 1 and 3). As shown in FIGS. 1, 3, 9, 10, and 11, retractable stops 31 in a pick-up zone are longitudinally spaced along the sides of the table 30 for positioning a plurality of pipe sections in spaced parallel pick-up positions in which they extend transversely to the sides of the table with their axes horizontal for a loading operation to be hereinafter described. The stops are arranged in transversely aligned pairs 32—36 with the stops of each pair being adapted to be simultaneously actuated by individual hydraulic piston-cylinder mechanisms 37. Each pair of stops, beginning with 32, is successively moved from positions in which the tops of the stops are flush or below the surface of the table to positions in which they project above the surface of the table for halting the rolling motion of a pipe section at a predetermined pick-up position.

The pipe loading mechanism 40 includes a plurality of spaced, parallel, pipe-lifting fingers 41 which are designed to be respectively inserted into the ends of a corresponding plurality of pipe sections arranged as a group on the table 30, and to move the pipe sections as a group into position in a loading rack in any one of a number of superposed rows. Referring now to FIGS. 1 and 4, the fingers 41 are shown as forming part of a carriage 42, which may be moved vertically by means of endless chains attached to the sides of the carriage. Axial movement of the fingers toward and away from the pipe on table 30 is provided by a carrier 45 to which the fingers are attached, the carrier being reciprocally mounted on the carriage 42 and driven therealong by a motor 46. The motor may be actuated to move the fingers of the carrier longitudinally into the pipe for lifting the pipe by engagement with the inner periphery thereof, at which time the carriage is raised by action of the endless chains to cause the fingers to engage and lift the pipe to an elevation at which the pipe sections can be inserted horizontally into the loading rack R. Further, movement of the carrier serves to move the fingers and pipe horizontally into the rack, whereupon the carriage is lowered slightly to disengage the fingers from the pipe, the carrier is reversed to withdraw the fingers from the pipe while leaving the pipe in the rack, the carriage is lowered, and the cycle is repeated until the rack is fully loaded with superposed rows of pipe.

Figure 5:
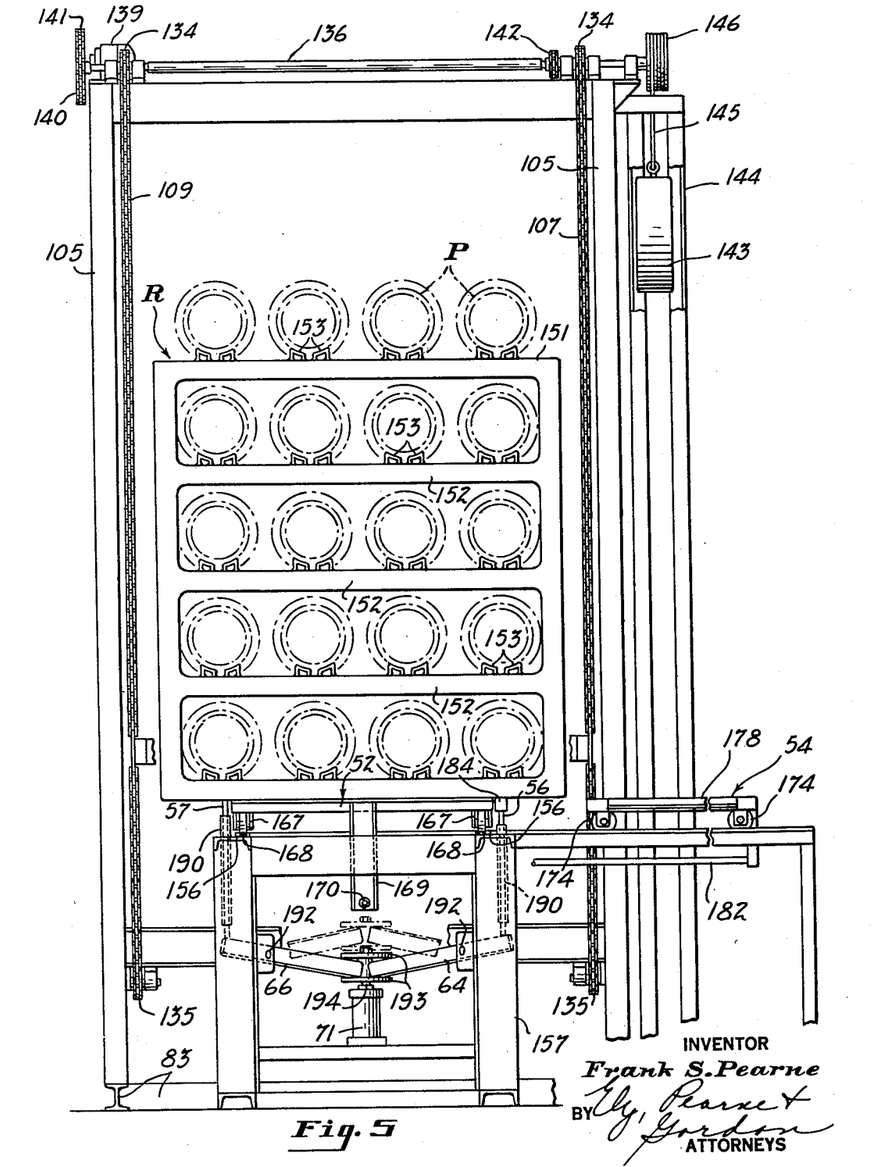
FIGURE 5 is a front elevation of the apparatus taken along the line 5—5 of FIG. 1.
Figure 6:
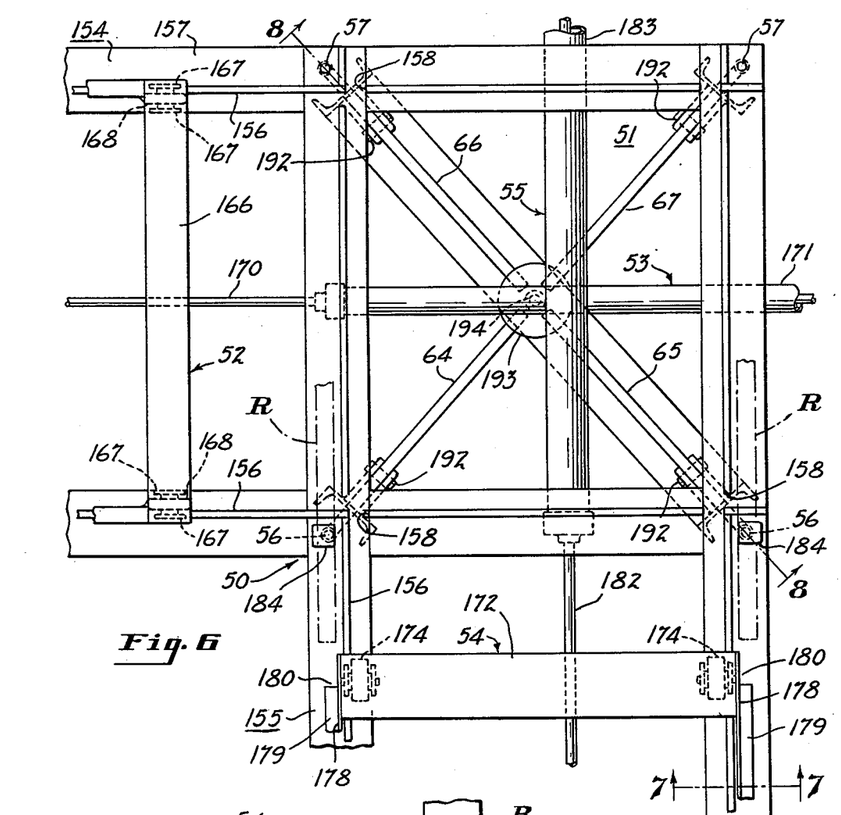
FIGURE 6 is a fragmentary plan view of the rack manipulating mechanism which forms another part of the invention.

As shown in FIG. 3, an L-shaped trackway 50 is situated adjacent the side of the table 30 opposite from the pipe fingers 41, the trackway serving the purpose of guiding the racks R to and away from a loading station 51 (FIG. 6). A dolly 52 is reciprocally moved along one leg of the trackway by a piston-cylinder mechanism 53, while another dolly 54 is reciprocated along the other leg of the trackway by a similar piston-cylinder mechanism 55. At the loading station 51, defined by the intersection of the legs of the trackway, there are front and rear pairs of rack lifting pins, designated by reference numbers 56 and 57, which may be raised from a level below the plane of the trackway by associated lever arms 64—67. These lever arms are adapted to be actuated by a piston-cylinder device 71 positioned below the trackway. In operation, an empty rack is placed on the dolly 52 with a portion of the sides of the rack projecting beyond the sides of the dolly, as shown in FIG. 5. The piston-cylinder mechanism 53 is then actuated to move the dolly 52 and the empty rack along the trackway to the loading station 51, the width of the rack being such that the projecting side portions will overlie the lifting pins 56, 57. At this time, the piston-cylinder device 71 is actuated to raise the pins and lift the empty rack from the dolly, the dolly being then withdrawn from the loading station and moved back to its starting point. While the odlly 52 is being withdrawn and while a previously loaded rack is being removed from the dolly 54 by a lift truck or the like, the rack at the loading station is loaded with pipe by the mechanism 40. Following the loading of the rack, the dolly 54 is moved along its leg of the trackway to the loading station, and the pins 56, 57 are lowered to rest the rack on the dolly. The dolly 54 and the loaded rack thereon may then be withdrawn from the loading station and the cycle repeated by moving another empty rack to the loading station in the manner described.

As will be apparent to those skilled in the art, the operation of the dolly-actuating piston-cylinder mechanisms 53 and 55, as well as the piston-cylinder device 71, may be either manually controlled or automatically controlled through the use of appropriately placed limit switches electrically connected to solenoid-actuated valves controlling the flow of fluid into and out of the various cylinders.

The general construction and operation of the apparatus embodying the invention having thus been set forth, the several components will now be described in detail.

When the green clay pipe is extruded from a press, it emerges bell end first from the die. When the pipe has been formed to its desired length, it is cut off at the die while supported on suitable off-bearing equipment, which is designed to move the pipe a short distance axially away from the die so that the spigot end will clear the die when the pipe is moved transversely away from the press.

In order that the pipe will be supported only along the body rearwardly of its bell end while being handled and transported, succeeding equipment must be adjustable to accommodate different lengths of pipe. To this end, the finishing tool 22 on the finishing machine 20 for spigot end of the pipe need have only a short path of axial movement, while the finishing tool for the bell end, as well as the cradle 21 and tray 25, must be mounted on the base 24 for substantial axial movement.

Similarly, the table 30 and the stops are desirably adjustable axially of the pipe to accommodate different lengths. Additionally, the stops are also adjustable longitudinally along the sides of the table in order that they may be effective to space a series of pipe whose diameters vary from one series to the next for subsequent manipulation by the fingers 41. Alternatively, the stops may be fixedly spaced one from another while appropriate adjustment means are provided for the fingers so that the distance between the fingers can be varied depending upon the diameter of the pipe to be loaded.

Figure 10:
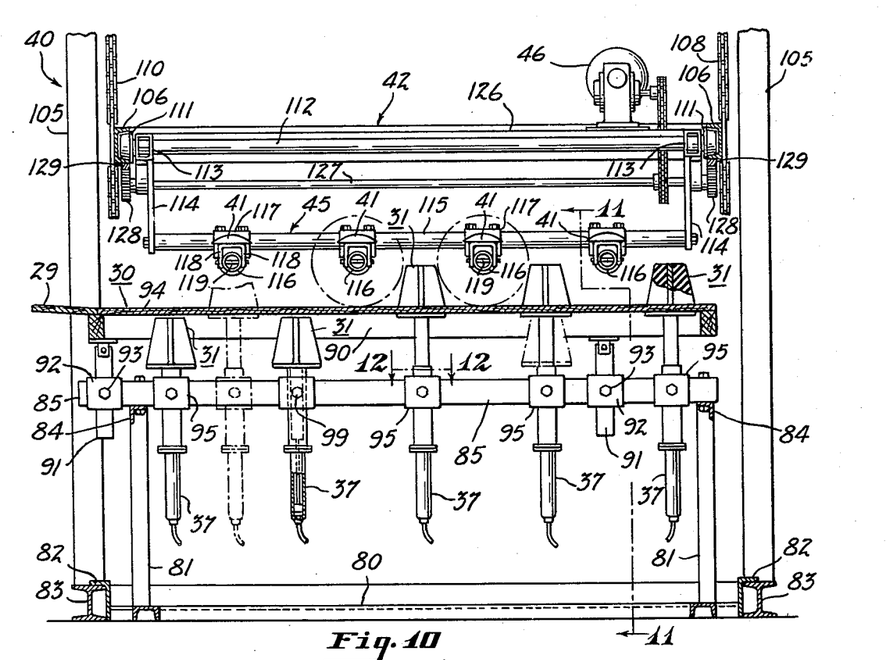
FIGURE 10 is a vertical sectional view of a portion of the apparatus taken along the line 10—10 of FIG. 1.
Figure 11:
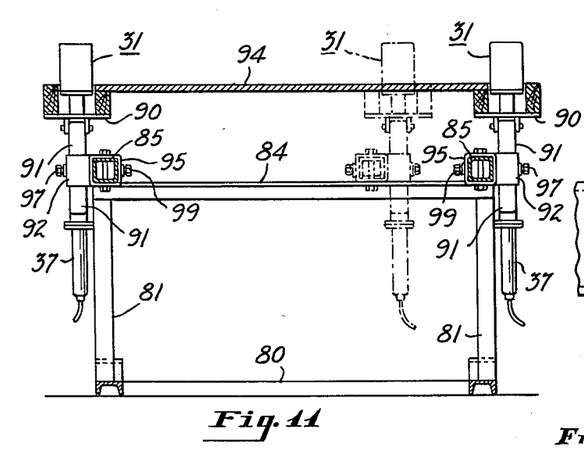
FIGURE 11 is a side elevation, partially in section, of a portion of the apparatus shown in FIG. 10.

Referring nows to FIGS. 3, 9, 10, 11, and 12, table 30 will be seen to include a base framework 80 having upwardly extending posts 81 and an adjustable top framework attached to the upper ends of the posts. The sides of base framework 80 are extended beyond the posts and have angle irons 82 attached thereto. As shown in FIG. 10, the angle irons will overlap a portion of the beams 83 which form a base for supporting the pipe loading mechanism 40, thus positioning the table in an operative position to receive pipe from the tray 25. The adjustable top framework of table 30 includes end members 84 fixedly secured to the upper ends of the posts 81 and side guide bars 85 connected to the upper surface of members 84. The members 84 are provided with a plurality of bolt holes 86 along their length so that the distance between the side guide bars can be varied depending upon the length of pipe to be handled, as indicated in FIG. 11.

Rectangular frames 90 are connected to the guide bars 85 by means of bars 91 which are held in brackets 92 adjustable along the length of the guide bars. The height of the frames 90 may be varied by means of adjusting screws 93 which are threaded through the brackets into engagement with supporting bars 91. The frames 90 serve as guides for the stops 31, and as a support for a supporting surface or table top 94 upon which the pipe may roll.

Guide bars 85 also carry brackets 95 similar to brackets 92. Each of these brackets 95 carries a piston-cylinder means 37, the piston of which is connected to a rubber stop 31 for moving the stop from a position below table top 94 to a point where the stop will contact the rolling pipe. As will be obvious to those skilled in the art, the adjustability of the brackets 95 along the guide bars 85 provides a method of spacing the pipe in accordance with their diameters so that the fingers 41 (hereinafter described in detail) are aligned with the pipe for the loading operation.

Figure 12:
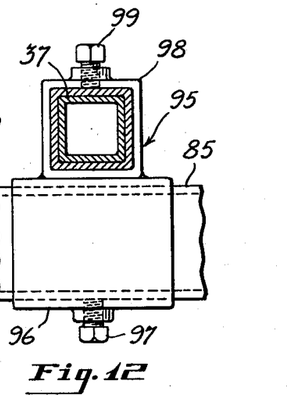
FIGURE 12 is a fragmentary view, partially in section, taken along the line 12—12 of FIG. 10.

Brackets 95, shown in detail in FIG. 12, include a collar 96 surrounding the guide bar 85, an adjusting screw 97 threaded into the collar and engageable with the guide bar, and a second collar 98 disposed at right angles to the collar 96. Each piston-cylinder means 37 is vertically adjustable in its collar 98 by means of a second adjusting screw 99.

Referring now to the details of the pipe loading mechanism 40, the carriage 42 is mounted for vertical movement within an open framework 105. The framework has a width substantially equal to the length of table 30 which may be either positioned within the framework at one end thereof in the manner described above, with the flanges of angle irons 82 overlapping the beams 83 forming the base of the framework, or the table 30 may be positioned with one side adjacent an end of the framework 105. The height of framework 105 is sufficient to permit the carriage to be placed in horizontal alignment with the top shelf of a rack R which is being loaded.

As shown in FIGS. 1, 2, 3, and 10, the carriage 42 is formed from longitudinally extending channel irons 106 connected at their ends to form a rigid frame. Vertical movement is imparted to the frame by endless chains 107, 108, 109, and 110 fastened to the channel irons 106. The pipe carrier 45 is mounted for reciprocal movement longitudinally of the carriage toward and away from a side of the pipe loading table 30 by means of rollers or wheels 111 which are received in the channel irons 106 and are rotatably mounted on shafts 112. The shafts 112 are received in longitudinally extending hollow bars 113 which form the framework of the pipe carrier, while depending support members 114 are fixed to the underside of the bars 113 at each end thereof. The depending members 114 carry a transversely extending bar 115 at the front and rear ends of the pipe carrier, and these bars serve to support a plurality of longitudinally extending rods 116. The pipe supporting fingers 41 are mounted adjacent the ends of the rods 116. It will be observed that the rods 116 are fixed to the bars 115 by means of brackets 117, the construction being such that the rods 116 can be variably spaced along the bars 115 are required to align the fingers 41 respectively with the bell ends of the pipe arranged on the table 30. The fingers 41 are also adjustably connected to the ends of rods 116 by means of the arms 118 which depend from each finger on either side of its rod 116, and which carry a pin 119 that extends through the sides of the rod, this structure being shown most clearly in FIGS. 1 and 10.

The pipe carrier 45 is driven along the carriage by a reversible fluid motor 46 mounted on the structural members 126 extending between the side bars 113 of the carrier. The motor 46 is drivingly connected to a shaft 127, which is rotatably carried on the underside of the carrier. Pinions 128 are fixed at either end of the shaft 127, and these pinions are operatively engaged with racks 129 mounted on the bottoms of the channel irons 106 of the carriage. As will be apparent from the described construction, actuation of the motor 46 will cause the carrier to be driven longitudinally of the carriage so that the fingers 41 will enter the ends of pipe arranged on the table 30.

When the fingers 41 have been engaged within the pipe, the carriage 42 is elevated by the chains 107—110 to position the fingers 41 and the pipe in horizontal alignment with an empty shelf of the rack R. Referring to FIGS. 1, 3, and 4 in particular, it will be seen that the chains 107—110 are arranged at each corner of the framework 105, and that they run substantially the full height of the framework about upper sprockets 134 and lower sprockets 135. The upper sprockets are keyed on shafts 136 and 137 mounted on the top of the framework 105 and extending parallel to each end thereof, while the lower sprockets 135 are mounted on separate shafts 138. A reversible fluid motor 139 is mounted on the top of the framework 105 and is drivingly connected to the shaft 136 by means of a chain 140 and a sprocket 141 keyed to this shaft. The shafts 136 and 137 are connected by another endless chain 142 which co-operates with a pair of additional sprockets (FIG. 3) respectively keyed to the shafts 136 and 137.

The chains 107—110 are connected to the channel irons 106 of the carriage, as shown in FIG. 4, so that actuation of the motor 139 will cause the carriage to move up or down within its supporting framework 105. A counterweight 143, slidably received within a rectangular frame 144, serves to assist the fluid motor in elevating the plurality of pipe sections for insertion into the loading rack. As best shown in FIG. 5, the counterweight is provided with a flexible cable 145 which is wound around a drum 146, the drum being keyed to the shaft 136 at the end opposite to the sprocket 141.

When the carriage 42 has been elevated by the above-described mechanism, the motor 46 is again actuated to move the pipe carrier 45 forward to insert the pipe sections into the rack R. Thereupon, the carriage is lowered enough to disengage the fingers 41 from the inner surfaces of the pipe as well as to rest the pipe sections on the rack. The motor 46 is then reversed to withdraw the fingers, the carriage is lowered to position the fingers in alignment with another group of pipe on the table 30, and the cycle is repeated.

The racks R for receiving the pipe may take the form of a pair of vertical end frames 151, each of which includes a plurality of vertically spaced shelves 152. Pipe trays composed of channel irons 153, or the like, are disposed in appropriately spaced pairs bridging and extending in both directions beyond the frames 151. The channel irons may either be removably secured to the shelves 152 in any desired manner so that the spacing of the channel irons can be adjusted to support different pipe of different diameters, or they may be welded to the shelves. Racks constructed in the manner described possess distinct advantages over conventional cantilever-type racks in that they are more rigid when heavily loaded with large diameter pipe. However, it is contemplated that the cantilever-type racks could be used in conjunction with the invention, if so desired.

The racks R are manipulated on the L-shaped trackway 50 by the dollies 52 and 54 to and away from the loading station 51 which is adjacent the outer side of table 30. Each leg 154 and 155 of the track is formed by rails 156 horizontally supported on a base frame 157. These rails define at their intersection the rectangular loading station 51 to be hereinafter described in more detail. As will be observed in FIG. 6, the upwardly extending flanges of the rails 156 are interrupted at points 158 to allow the wheels of the respective dollies to roll into the loading station.

As shown most clearly in FIGS. 1, 3, and 5, an empty rack is moved into the loading station 51 by the dolly 52 traveling on the leg 154 of the trackway. The dolly 52 may take the form of a platform having rack supporting end members 165 and 166 connected together to form a rectangular structure, the width of the platform being slightly less than that of the rack R so that, when the rack is positioned on the dolly, a portion of the sides of the rack will overhang the sides of the platform of the dolly. Two legs 167, depending from the underside of the dolly platform at each corner thereof form a support for separately mounted wheels 168. A leg 169 also extends downwardly from the dolly platform, and to this leg is fixed a piston rod 170 of a piston-cylinder mechanism 53, the cylinder 171 of which is suitably mounted below the loading station 51 on the base frame 157 of the trackway. Suitable connections (not shown) are provided between the cylinder 171 and a fluid source. The piston-cylinder mechanism 53 may be either manually operated to reciprocate dolly 52 along its track, or automatically controlled by means of limit switches properly disposed in the path of movement of the dolly.

Figure 7:
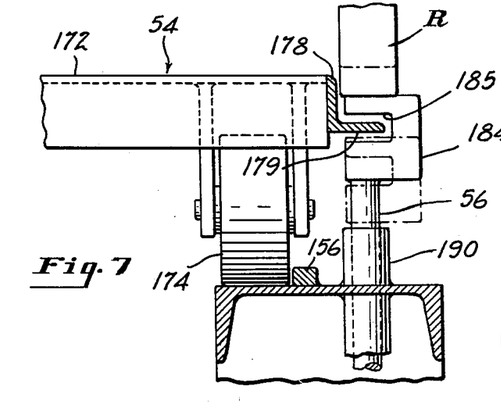
FIGURE 7 is a fragmentary view, partially in section, taken along the line 7—7 of FIG. 6.
Figure 8:
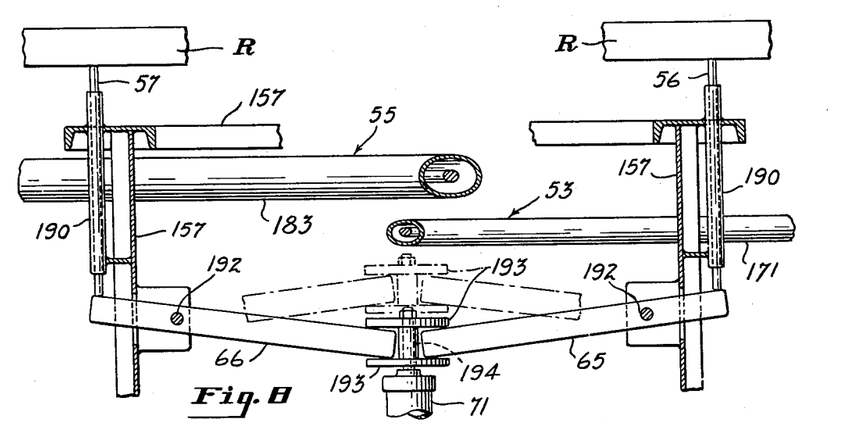
FIGURE 8 is a sectional view taken along the line 8—8 of FIG. 6.
Figure 9:
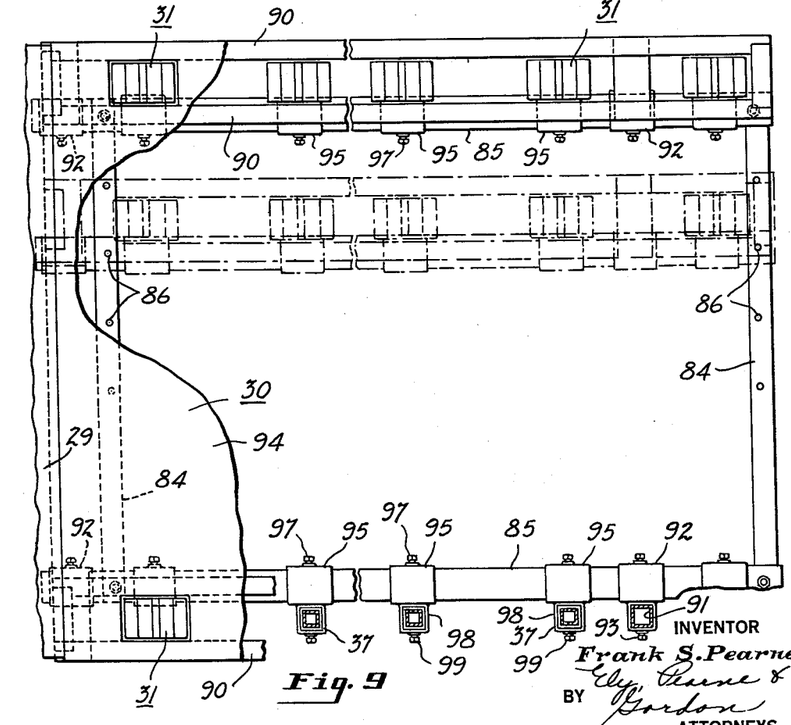
FIGURE 9 is a plan view, partially in section, of the pipe receiving table for receiving and positioning pipe sections which are serially discharged from the pipe finishing machine.

Loaded racks are removed from the loading station by means of an off-bearing dolly 54 traveling on the leg 155 of the trackway. The dolly 54 is generally similar in construction to dolly 52 and includes end members 172 and 173, wheels 174 separately mounted at the corners of the dolly, and a depending arm 175. The end members 172 and 173 are connected by side angle irons 178, having an outwardly projecting flange 179 which provides support for the loaded rack (FIGS. 1 and 7). It will be observed that the flanges 179 terminate short of each end of the dolly to form corner spaces 180 (FIG. 6) for a purpose hereinafter described. A piston-cylinder mechanism 55 has its piston rod 182 connected to the arm 175 of the dolly 54 and is disposed beneath the trackway with its cylinder 183 mounted on the base frame 157 of the trackway. Actuation of the piston-cylinder mechanism 55 may be either manually or automatically controlled as described in connection with the similar mechanism 53 of the other dolly 52.

Transfer of the rack from dolly 52 to the off-bearing dolly 54 is completed at the loading station 51 in such a manner that dolly 52 will be free to return to its starting position to receive a second empty rack at the same time that the first rack is in the process of being loaded. To this end, the rectangular loading station 51 is provided at its front and rear corners, respectively, with the pairs of lifting pins 56 and 57, which are actuatable to contact overhanging portions of a rack positioned on the dolly 52 and to raise the rack above the platform of this dolly. The distance between the pairs of pins 56 and 57 is sufficient to permit the dolly 52 to move therebetween for withdrawal from the loading station while a rack is held in an elevated position by these pins.

The pins 56, 57 are all similarly slidable in elongated brackets 190 fastened to the base frame 157 at each corner of the loading station 51, and respectively have their lower ends supported on the outer ends of the lever arms 64—67. These lever arms are pivotally connected to the base frame 157 at 192 a short distance inwardly from their outer ends and have their inner ends supported between upper and lower collars 193 fastened to a piston rod 194 of a piston-cylinder device 71. The piston-cylinder device 71 is also mounted on the base frame 157 beneath the trackway and serves to rock the lever arms 64—67 and raise or lower the pairs of pins 56, 57, depending upon whether the piston rod is lowered or raised, respectively.

It will be observed in FIG. 7 that each of the front lifting pins 56 includes a head 184 which is provided with an inwardly opening, horizontal slot 185. The purpose of these slots is to permit the side flanges 179 of the off-bearing dolly to pass between these pins 56. When the dolly 54 has been positioned, the front pins 56 and the back pins 57 will be adjacent the ends of the flanges 179 in the corner spaces 180 of this dolly. With this dolly in this position, the pins can be lowered to seat the loaded rack on the dolly side flanges 179.

The operation of the invention will be largely obvious from the foregoing general and detailed description. In summary, pipe sections discharged at substantially regular intervals from a pipe finishing machine 20 or other apparatus are positioned in the pick-up zone on the table 30 in spaced arrangement by means of the rubber stops 31, which are successively raised from below the surface of the table 30 to contact and halt the rolling pipe. When the group of pipe sections has been arranged in the pick-up zone in the desired manner on the table 30, the fingers 41 are caused to enter pipe at the bell ends thereof by movement of the carrier 45 toward the pipe. At this point the carriage 42 is vertically raised by the endless chains 107—110 to a point where the pipe is slightly above the horizontal plane of an empty row of pipe trays 153 in the rack R. Further movement of the carrier 45 in the same direction as before, followed by slight lowering of the carriage 42, causes the pipe to be deposited on the trays and the fingers to lower out of engagement with the pipe, at which time the carrier is retracted to withdraw the fingers from the pipe. The carriage is then lowered to its original position and the cycle repeated until each shelf of the rack R has been loaded.

The rack R is supported by the pins 56, 57 while being loaded, and subsequently is lowered onto the off-bearing dolly 54 by retraction of the piston-cylinder device 71 for removal from the loading station by the off-bearing dolly to a position where the rack may be picked up by a lift truck or other apparatus. During the time that the loaded rack is being removed from the dolly 54, another rack is moved to the loading station by the dolly 52 and is lifted therefrom by the pairs of pins 56, 57. The dolly 52 is then withdrawn and the rack loaded, by which time the dolly 54 will have been unloaded and again moved to the loading station.

While the dolly manipulating cycle has been disclosed as one in which the loaded rack is removed in a direction transverse to the axes of the pipe, and the empty racks moved in a parallel direction, it will be obvious that this procedure could be reversed. That is, the loaded rack could be moved on the tracks extending parallel to the pipe axes, and the empty racks moved in a transverse direction. It will also be obvious to those skilled in the art that the trackway could be arranged in the form of a T instead of an L with the tracks 155 extending across the tracks 154. With this construction, two off-bearing dollies could be used, each dolly operating between an opposite end of the track 155 and the loading station.

The above-described, preferred embodiment of the invention has been disclosed as being especially adapted to be used in conjunction with racks R having their several shelves supported at opposite sides thereof, as distinguished from conventional cantilever-type loading racks. The embodiment shown in FIGS. 13 through 19, on the other hand, is adapted for use with cantilever racks, and will now be described in detail.

Figure 16:
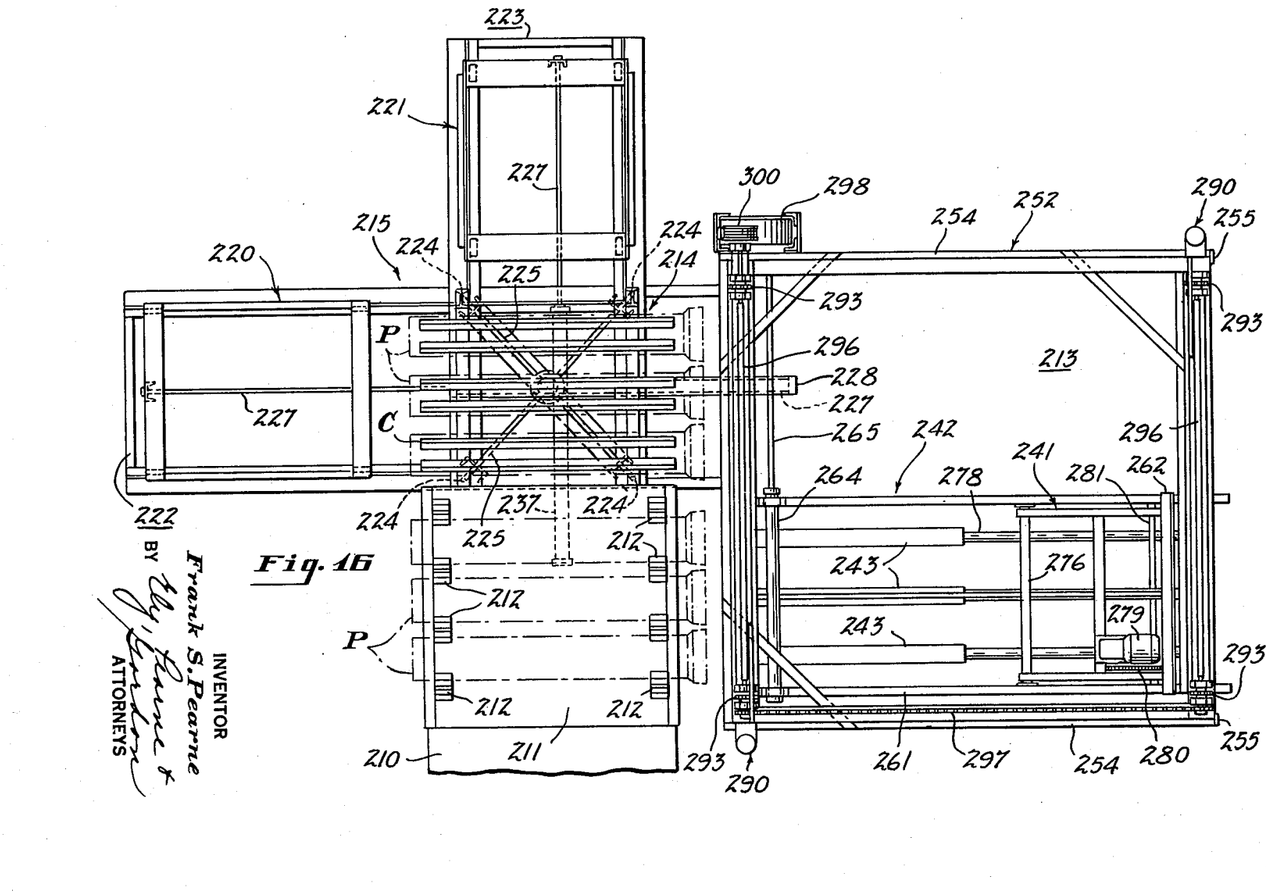
FIGURE 16 is a top plan view of the apparatus shown in FIG. 13.
Figure 17:
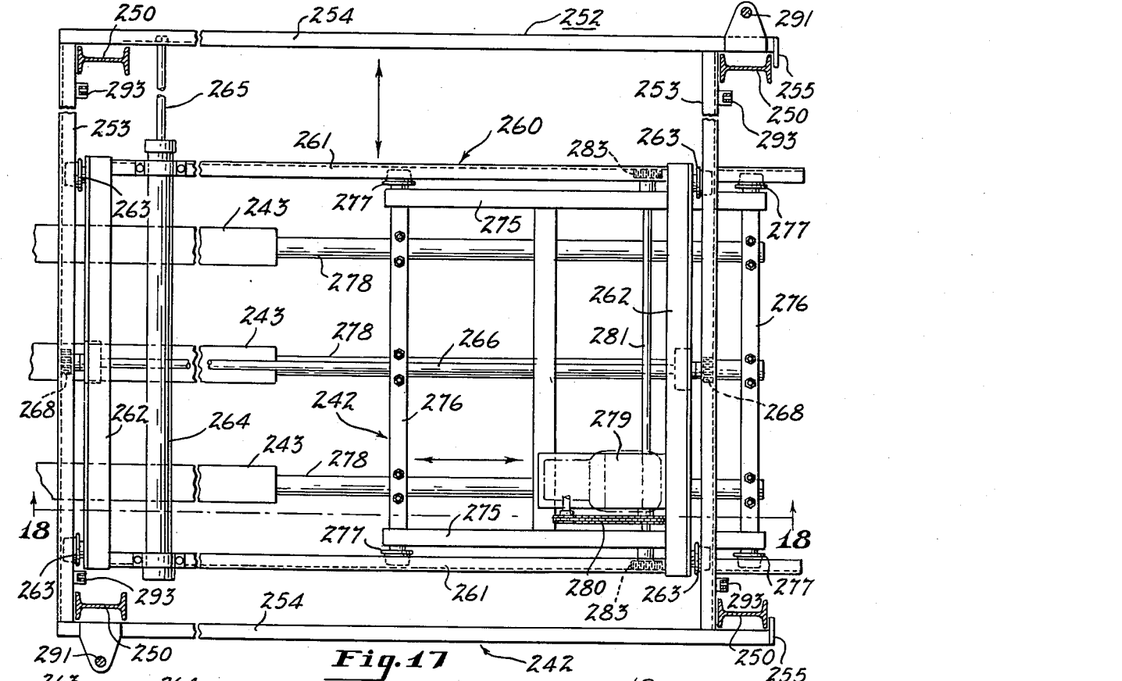
FIGURE 17 is a fragmentary horizontal elevation taken along the line 17—17 of FIG. 13.
Figure 18:
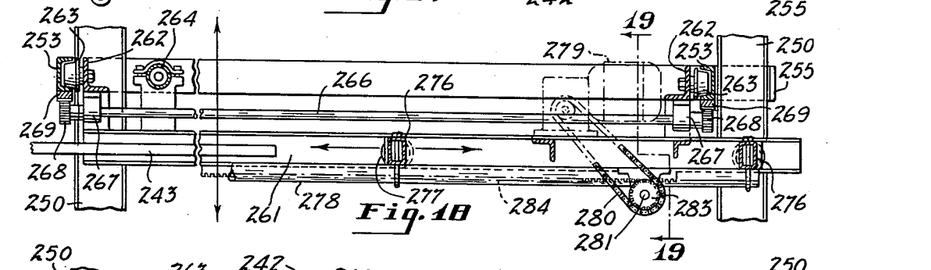
FIGURE 18 is a fragmentary vertical section taken along the line 18—18 of FIG. 17.
Figure 19:
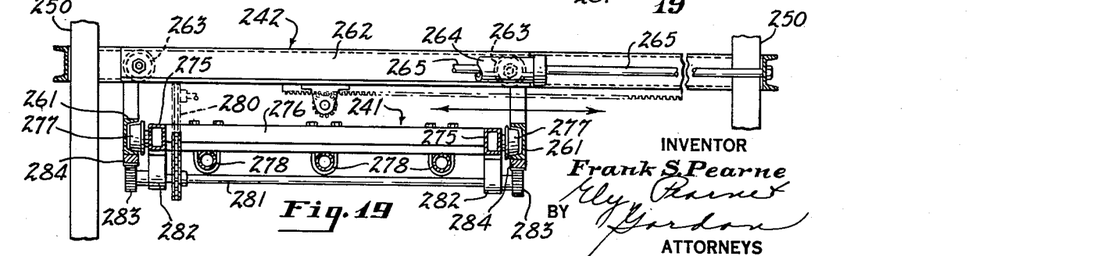
FIGURE 19 is a sectional view taken along the line 19—19 of FIG. 18.

This mechanism may also be associated with any machine which discharges cylindrical objects at substantially regular intervals, such as a pipe finishing machine. Preferably, the pipe are discharged onto an inclined surface 210 which leads to a pipe positioning table 211 in the pick-up zone. The pipe positioning table 211 is similar in construction to the previously described table 30, and includes adjustable and retractable stops 212 for positioning the pipe therealong. Instead of the table being located within the framework of the pipe elevating mechanism 213, however, the table 211 is positioned outside the framework near one end thereof, and also adjacent a loading station 214 at intersecting legs of an L-shaped trackway 215 (FIG. 16).

The trackway 215 is also similar to the previously described trackway 50 and includes supply and off-bearing dollies 220 and 221 operating on the legs 222 and 223, respectively, of the trackway for moving cantilever racks C to and away from the loading station 214. Rack elevating pins 224, operated by lever arms 225 and a piston-cylinder device 226 are provided at the loading station for transferring pipe racks C from the supply dolly 220 to the off-bearing dolly 221. As in the previous embodiment, the dollies are actuated by piston-cylinder mechanisms 227, the cylinders of which are secured to the base of framework of the trackway by similar projecting cylinder supports 228 (only one being shown).

Figures 13, 14, 15:
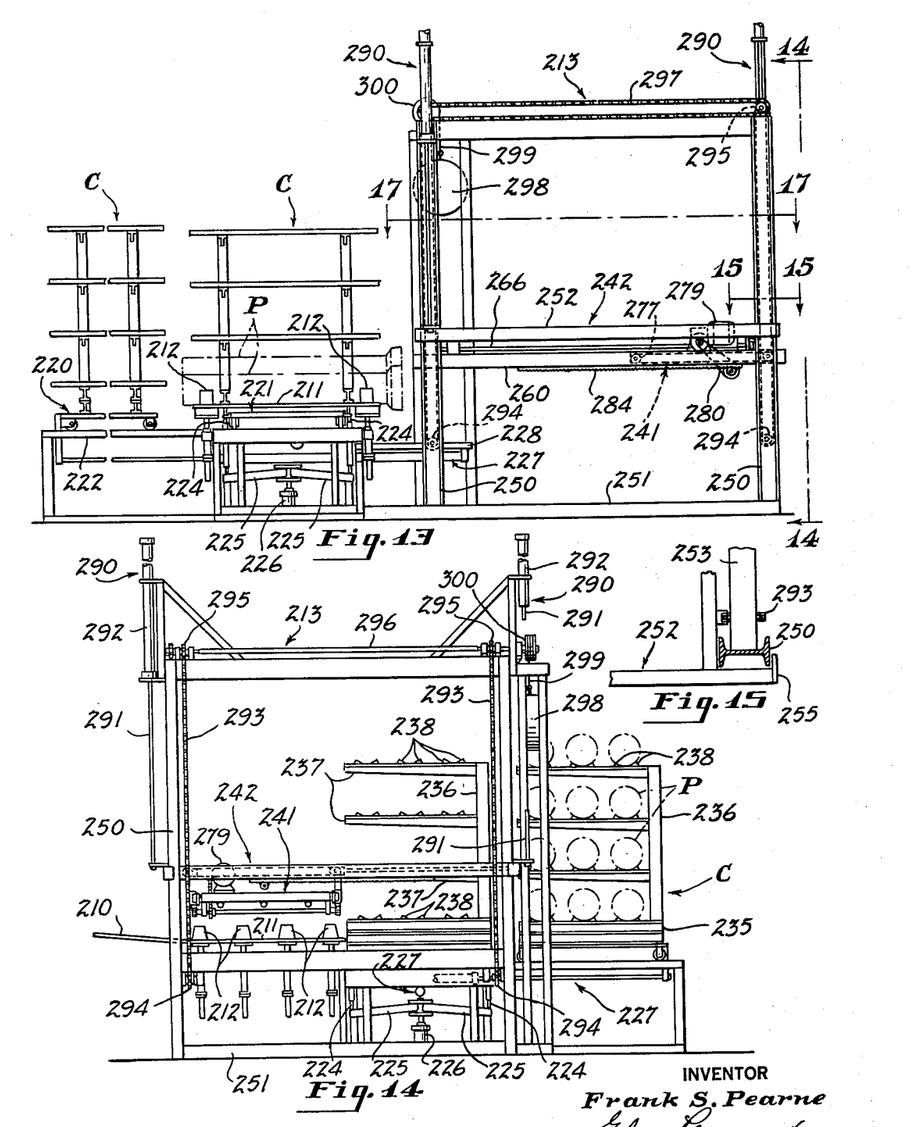
FIGURE 13 is a side elevation of another embodiment of the pipe loading apparatus comprising the invention.
FIGURE 14 is an end elevation taken along the line 14—14 of FIG. 13.
FIGURE 15 is a fragmentary view taken along the line 15—15 of FIG. 13.

Referring to FIG. 14, the cantilever racks C are shown as including a base 235, an end frame 236, and a plurality of cantilever arms 237 attached at one end to the frame 236 and extending horizontally and generally parallel to the base 235. A plurality of angle irons 238 or the like are arranged in spaced pairs transversely of the rack arms 237 to form pipe trays. As indicated in FIGS. 13 and 14, the racks are positioned at the loading station with the free ends of the rack arms projecting toward the table 211.

The pipe elevating and loading mechanism 213 includes a pipe carrier 241 having pipe engaging fingers 243 which are adapted to enter the ends of the pipe positioned on the table 211. The pipe carrier is mounted for both longitudinal and transverse movement on a vertically reciprocable carriage 242 so that the fingers can first be moved to enter and lift the positioned pipe, and can also be moved transversely to carry the pipe toward and into the open end of the rack C to load the pipe on the trays of a shelf rack after the carriage 242 has been elevated to the proper height for the particular rack shelf to be loaded.

As shown, the specific construction of the pipe elevating and loading mechanism includes four columns 250 extending vertically from a base 251, thus forming an open framework which supports the carriage 242.

The carriage 242 consists of an outer frame 252 which slides up and down along the columns 250. The ends of the outer frame are formed from spaced, parallel, channel irons 253 (FIG. 17), one being located inwardly of the columns 250 at one end of the outer frame and being located outwardly of the columns 250 at the other end of the outer frame. The outer frame 252 is completed by spaced, parallel, side members 254. At the end of the outer frame at which the channel iron 253 is located inwardly of the column 250, the sides 254 are extended past the channel iron and are provided with inwardly directed flanges 255 which constitute the guide braces for the frame 252.

The carriage 242 further includes a smaller inner frame 260 comprising parallel channels 261 forming opposite sides of this frame, and parallel, transversely extending angle irons 262, which are spaced above and rigidly interconnected with the side channels adjacent opposite ends thereof. Wheels 263 are rotatably mounted on the angle irons 262 adjacent each end corner of the inner frame 260, and these wheels are received in the channel irons 253 of the outer frame 252 so that the inner frame can be moved transversely from one side of the outer frame to the other.

Movement is imparted to the inner frame 260 by a cylinder 264 fastened to the side channels 261 of the inner frame, a cooperating piston rod 265 being connected to the side of the outer frame 252. The inner frame 260 also includes a shaft 266 connected to the underside of the ends 262 by the journal brackets 267. This shaft is provided on its ends with pinions 268 which mesh with racks 269 carried on the underside of the channel irons 253 of the outer frame 252. This rack and pinion arrangement prevents the inner frame 260 from cocking out of alignment with the outer frame 252 when the inner frame is moved.

The pipe carrier 241 is mounted for longitudinal movement relative to the inner carriage frame 260. As in the case of the previously described pipe carrier 45, the carrier 242 includes pairs of side and end members 275 and 276, respectively, and wheels 277 mounted on the side member 275 adjacent corners of the carrier, the wheels being received in the side channels 261 of the inner frame 260. A plurality of bars 278 are fastened to the underside of the end members 276 of the carrier in spaced, parallel alignment, and these bars carry, at their ends, the pipe supporting fingers 243.

The pipe carrier 241 is moved by a reversible fluid motor 279 mounted on the top of the carrier. This motor is drivingly connected by a chain 280 to a shaft 281 carried in the legs 282 depending from the sides 275. Pinions 283 are keyed to the ends of the shaft 281, and these pinions mesh with racks 284 fastened to side channels 261 of the inner frame 260.

The outer frame 252 is vertically moved by means of piston-cylinder mechanisms 290 which may be vertically positioned at opposite corners of the framework 105.

As shown in FIG. 14, the pistons 291 of the piston-cylinder mechanisms are fastened to the outer frame 252, while the cylinders 292 are connected to the columns 250. The sides of the outer frame 252 are also connected to endless chains 293 in the same manner as shown in FIG. 4. These chains pass around lower sprockets 294 connected to the columns 250 near their bottoms, and upper sprockets 295 which are keyed on the shafts 296. The shafts 296 are connected by another chain 297. A counterweight 298 is provided for assisting in the elevation of the carriage, and this counterweight is fastened to one end of a flexible connecting cable or chain 299 which is wound around a drum 300, the drum being mounted on one of the shafts 296. It will be apparent that, while fluid cylinder-piston mechanisms have been shown as constituting the actuating means for the carriage, a fluid motor could be provided instead, in the manner described in connection with the embodiment of FIGS. 1–12.

In operation, the rack C is carried to the loading station 214 by the serving dolly 220, at which point the rack is raised from this dolly by the pins 224 and this dolly is withdrawn. While the rack is held by the pins, the motor 279 is actuated to move the carrier 241 toward the table 211 in the pick-up zone for positioning the fingers 243 within pipes arranged on the table 211. The piston-cylinder mechanisms 290 are then actuated to elevate the carriage 242 to a point where the pipes are in alignment with an empty shelf of pipe trays in the rack C. The pipes may be then inserted into the rack C by actuating the cylinder 264 which serves to move the pipe carrier toward the rack. After slight lowering of the carriage 242 to rest the pipe on the trays and disengage the fingers from the inside surfaces of the pipe, the fingers are withdrawn from the pipe by reversing the motor 279, the carriage is lowered and moved laterally to position the fingers in alignment with another group of pipe rolled into position on the table 211 after removal of the preceding group, and the cycle repeated.

Following loading of the rack, the off-bearing dolly 221 is moved to the loading station, the pins 224 are lowered to seat the rack on this dolly, and the rack removed thereon. It will be apparent that the operation of the dollies, as well as the operations of the pipe carrier and carriage, can be either manually controlled or automatically controlled by means of appropriately placed limit switches which operates the various cylinders and motors.

It is to be understood, of course, that the foregoing disclosure relates only to preferred embodiments of the invention and that it is intended to cover all changes and modifications of the examples of the invention, herein chosen for the purposes of disclosure, which do not depart from the spirit and scope of the invention as defined by the appended claims.

What is claimed is:

1. Rack loading apparatus comprising a pipe receiving table positioned to receive pipe rolled thereon, said pipe receiving table comprising a rectangular framework having a top surface for supporting said pipe, stop means longitudinally spaced along the sides of said table, said stop means being arranged in transversely aligned pairs, and means for successively actuating each pair of stops to cause said stops to contact pipe rolled onto said table and to arrange said pipe in spaced alignment transverse to the sides of said table; rack manipulating means for moving an empty rack into a loading station adjacent one side of said table so that said rack can be loaded by a pipe loading mechanism and for removing the loaded rack from said loading station, said rack manipulating means comprising a rack supporting means movable toward and away from said loading station, means for moving said rack supporting means, and rack lifting means at said loading station for lifting a rack from said rack supporting means; and pipe loading mechanism for loading pipe positioned on said table into a rack at said loading station, said pipe loading mechanism comprising a framework having an end positioned adjacent to the side of said table opposite from said loading station, a carriage means mounted in said framework for vertical movement, means for raising and lowering said carriage, a pipe carrier mounted on said carriage for movement toward and away from said end of said framework, means for moving said pipe carrier, and a plurality of pipe engaging fingers mounted on said pipe carrier in spaced, pipe engaging alignment, said fingers extending toward said opposite side of said table so that movement of said carrier and elevation of said carriage will cause pipe to be loaded in a rack at said loading position.

2. Rack loading apparatus comprising a pipe receiving table positioned to receive pipe rolled thereon, said pipe receiving table comprising a rectangular framework having a top surface for supporting said pipe, stop means longitudinally spaced along the sides of said table, said stop means being arranged in transversely aligned pairs, and means for successively actuating each pair of stops to cause said stops to contact pipe rolled onto said table and to arrange said pipe in spaced alignment transverse to the sides of said table; rack manipulating means for successively positioning empty racks having superposed rows of pipe trays at a loading station adjacent to one side of said table for loading by a pipe loading mechanism and for successively removing loaded racks from said loading station, said rack manipulating means comprising first and second rack supporting means having intersecting paths of travel, said loading station being defined by the intersection of said paths of travel, means for moving said first and second rack supporting means to and from said loading station, and rack elevating means at said loading station for lifting a rack from said rack supporting means so that said rack can be transferred to said second rack supporting means by lowering said pins; and pipe loading mechanism for loading pipe positioned on said table into a rack at said loading station, said pipe loading mechanism comprising a framework having an end positioned adjacent to the side of said table opposite from said loading station, a carriage means mounted in said framework for vertical movement, means for raising and lowering said carriage, a pipe carrier mounted on said carriage for movement toward and away from said end of said framework, means for moving said pipe carrier, and a plurality of pipe engaging fingers mounted on said pipe carrier in spaced, pipe engaging alignment, said fingers extending toward said opposite side of said table so that movement of said carrier and elevation of said carriage will cause pipe to be loaded in a rack at said loading position.

3. Rack loading apparatus comprising a pipe receiving table positioned to receive pipe rolled thereon, said pipe receiving table comprising a rectangular framework having a top surface for supporting said pipe, stop means longitudinally spaced along the sides of said table, said stop means being arranged in transversely aligned pairs, and means for successively actuating each pair of stops to cause said stops to contact pipe rolled onto said table and to arrange said pipe in spaced alignment transverse to the side of said table; a rack manipulating means for successively positioning empty racks having superposed rows of pipe trays at a loading station adjacent to one side of said table for loading by a pipe loading mechanism and for successively removing loaded racks from said loading station, said rack manipulating means comprising an L-shaped trackway, said loading station being defined by the intersection of the legs of said trackway, a vertically movable pin at each corner of said loading station, pin actuating means for moving said pins from below the plane of said trackway to a position above the plane of said trackway, a first dolly mounted for travel along one leg of said trackway, first piston-cylinder means for actuating said first dolly to move an empty rack into said loading station so that actuation of said pin actuating means will cause said pins to lift an empty rack from said dolly and to permit said dolly to be withdrawn from said loading station, a second dolly mounted for travel along the other leg of said trackway, and second piston-cylinder means for moving said second dolly into said loading station beneath a rack supported by said pins and for removing said second dolly from said loading station when said pins have been retracted to position said rack on said second dolly; and pipe loading mechanism for loading pipe positioned on said table into a rack at said loading station, said pipe loading mechanism comprising a framework having an end positioned adjacent to the side of said table opposite from said loading station, a carriage means mounted in said framework for vertical movement, means for raising and lowering said carriage, a pipe carrier mounted on said carriage for movement toward and away from said end of said framework, means for moving said pipe carrier, and a plurality of pipe engaging fingers mounted on said pipe carrier in spaced, pipe engaging alignment, said fingers extending toward said opposite side of said table so that movement of said carrier and elevation of said carriage will cause pipe to be loaded in a rack at said loading position.

4. Rack loading apparatus comprising a pipe receiving table positioned to receive pipe rolled thereon, said pipe receiving table comprising a rectangular framework having a top surface for supporting said pipe, stop means longitudinally spaced along the sides of said table, said stop means being arranged in transversely aligned pairs, and means for successively actuating each pair of stops to cause said stops to contact pipe rolled onto said table and to arrange said pipe in spaced alignment transverse to the side of said table; rack manipulating means for moving an empty rack into a loading station adjacent one side of said table so that said rack can be loaded by a pipe loading mechanism and for removing the loaded rack from said loading station, said rack manipulating means comprising a rack supporting means movable toward and away from said loading station, means for moving said rack supporting means, and rack lifting means at said loading station for lifting a rack from said rack supporting means; and pipe loading mechanism for loading pipe positioned on said table into a rack held by said pins at said loading station, said pipe loading mechanism comprising a vertical framework having an end adjacent to the side of said table opposite from said loading station, a carriage slidably mounted in said framework for vertical movement, actuating means connected to said framework and to said side members for raising and lowering said carriage, a pipe carrier mounted for movement on said carriage, means connected to said carrier for moving said carrier toward and away from said end of said framework and a plurality of pipe engaging fingers adjustably connected to said carrier, said pipe engaging fingers being parallel to and extending toward said opposite side of said table so that movement of said pipe carrier toward said one end of said framework will cause said fingers to enter the ends of said pipe and whereby vertical movement of said carriage will cause said pipe to be positioned for loading at said loading station with continued movement of said carrier causing said pipe to be loaded on an empty row of trays of said rack.

5. Rack loading apparatus comprising a pipe receiving table positioned to receive pipe rolled thereon, said pipe receiving table comprising a rectangular framework having a top surface for supporting said pipe, stop means longitudinally spaced along the sides of said table, said stop means being arranged in transversely aligned pairs, and means for successively actuating each pair of stops to cause said stops to contact pipe rolled onto said table and to arrange said pipe in spaced alignment transverse to the sides of said table; rack-manipulating means for moving an empty rack into a loading station adjacent one side of said table so that said rack can be loaded by a pipe loading mechanism and for removing the loaded rack from said loading station, said rack manipulating means comprising a rack supporting means movable toward and away from said loading station, means for moving said rack supporting means, and rack lifting means at said loading station for lifting a rack from said rack supporting means; and pipe loading mechanism for loading pipe positioned on said table into a rack held by said pins at said loading station, said pipe loading mechanism comprising a vertical framework having an end adjacent to the side of said table opposite from said loading station, a carriage slidably mounted in said framework for vertical movement, said carriage comprising a rectangular frame having channel-shaped side members, actuating means connected to said framework and to said side members for raising and lowering said carriage, a pipe carrier, wheels on said pipe carrier, said wheels being mounted for movement in said channel-shaped side members, means connected to said carriage and to said carrier for moving said carrier toward and away from said end of said framework, said carrier moving means including a reversible motor secured to said carrier, racks mounted on the underside of said side members of said carriage, a transverse, rotatable shaft carried by said carrier, pinions on the ends of said shaft engageable with said racks, and means connecting said motor to said shaft, a transverse bar carried by said carrier, and a plurality of pipe engaging fingers adjustably connected to said bar so that said pipe engaging fingers can be arranged in spaced alignment, said pipe engaging fingers being parallel to and extending toward said opposite side of said table so that movement of said pipe carrier toward said one end of said framework will cause said fingers to enter the ends of said pipe and vertical movement of said carriage will cause said pipe to be positioned for loading at said loading station adjacent a row of empty pipe trays in a rack with continued movement of said carrier causing said pipe to be loaded on said empty row of trays.

6. Rack loading apparatus comprising a pipe receiving table for receiving pipes which are rolled onto said table, said table including a rectangular frame having end and side members, said side members being movable toward and away from each other to vary the width of said table, a table top, means adjustably connecting said table top to said side members so that the height of said table top can be varied, pipe stops longitudinally spaced along said side member, said stops being arranged in transversely aligned pairs, and means for successively actuating each pair of stops whereby said stops are caused to move from below said table top to a point above its surface to position said pipe in spaced alignment transverse to the sides of said table; rack manipulating means for successively positioning empty racks having superposed rows of pipe trays at a loading station adjacent to one side of said table for loading by a pipe loading mechanism and for successively removing loaded racks from said loading station, said rack manipulating means comprising first and second rack supporting means having intersecting paths of travel, said loading station being defined by the intersection of said paths of travel, means for moving said first and second rack supporting means to and from said loading station, and rack elevating means at said loading station for lifting a rack from said first rack supporting means so that said rack can be transferred to said second rack supporting means by lowering said pins; and pipe loading mechanism for loading pipe positioned on said table into a rack held by said pins at said loading station, said pipe loading mechanism comprising a vertical framework having an end adjacent to the side of said table opposite from said loading station, a carriage slidably mounted in said framework for vertical movement, actuating means connected to said framework and to said side members for raising and lowering said carriage, a pipe carrier mounted for movement on said carriage, means connected to said carrier for moving said carrier toward and away from said end of said framework, and a plurality of pipe engaging fingers adjustably connected to said carrier, said pipe engaging fingers being parallel to and extending toward said opposite side of said table so that movement of said pipe carrier toward said one end of said framework will cause said fingers to enter the ends of said pipe and vertical movement of said carriage will cause said pipe to be positioned adjacent a row of empty pipe trays in a rack at said loading station with continued movement of said carrier causing said pipe to be loaded on said empty row of trays.

7. Rack loading apparatus comprising a pipe receiving table for receiving pipe which are rolled onto said table, said table including a rectangular frame having end and side members, said side members being detachably fastened to said end members so that said side members can be moved toward and away from each other to vary the width of said table, a table top, means adjustably connecting said table top to said side members so that the height of said table top can be varied, a plurality of pipe stops along the sides of said table, said pipe stops being arranged in transversely aligned pairs, and piston-cylinder means adjustably secured to said side members for successively actuating each pair of stops from below said table top to a point above its surface to position said pipe in spaced alignment transverse to the sides of said table; rack manipulating means for successively positioning empty racks having superposed rows of pipe trays at a loading station adjacent to one side of said table for loading by a pipe loading mechanism and for successively removing loaded racks from said loading station, said rack manipulating means comprising a trackway having intersecting tracks, said loading station being defined by the intersection of said tracks, lifting pins at said loading station, pin actuating means for moving the pins from below the plane of said trackway to a position above the plane of said trackway, first rack supporting means mounted for travel along one of said tracks, first piston-cylinder means for actuating said first rack supporting means to move an empty rack into said loading station over said pins so that actuation of said pin actuating means will cause said pins to lift an empty rack from said rack supporting means to permit said rack supporting means to be withdrawn from said loading station, a second rack supporting means mounted for travel along the other of said tracks, and second piston-cylinder means for moving said second rack supporting means into said loading station beneath a rack supported by said pins and for removing said second rack supporting means from said loading station when said pins have been retracted; and pipe loading mechanism for loading pipe positioned on said table into a rack held by said pins at said loading station, said pipe loading mechanism comprising a vertical framework having an end adjacent to the side of said table opposite from said loading station, a carriage slidably mounted in said framework for vertical movement, said carriage comprising a rectangular frame having channel-shaped side members, actuating means connected to said framework and to said side members for raising and lowering said carriage, a pipe carrier, wheels on said pipe carrier, said wheels being mounted for movement in said channel-shaped side members, means connected to said carriage and to said carrier for moving said carrier toward and away from said end of said framework, a transverse bar carried by said carrier, and a plurality of pipe engaging fingers adjustably connected to said bar so that said pipe engaging fingers can be arranged in spaced alignment, said pipe engaging fingers being parallel to the axes of said pipe and extending toward said opposite of said table so that movement of said pipe carrier toward said one end of said framework will cause said fingers to enter the ends of said pipe and vertical movement of said carriage will cause said pipe to be positioned adjacent a row of empty pipe trays in a rack at said loading station with continued movement of said carrier causing said pipe to be loaded on said empty row of trays.

8. Rack loading apparatus comprising, in combination, (a) a pipe positioning mechanism for moving cylindrical pipe, one after another, into a pick-up zone in predetermined, uniformly spaced, parallel, pick-up positions with their axes horizontal, said mechanism including restraining means to restrain rolling of the pipe from their respective pick-up positions; (b) a rack positioning mechanism for supporting a rack in a predetermined loading position laterally adjacent said positioning mechanism; and (c) a pipe loading mechanism for successively loading groups of pipe from said pick-up positions onto a rack supported in said loading position so as to deposit each group at a selected elevation on the rack while maintaining the positions of the pipe in each group relative to each other, said loading mechanism comprising (1) a frame mounted in a fixed location relative to said pipe and rack positioning mechanisms, (2) a main carriage mounted on said frame for vertical movement thereon to any selected level within its range of movement, said main carriage including spaced rails extending horizontally and parallel to a common center line of said pick-up zone and loading position, and (3) a carrier mechanism mounted on said rails for travel back and forth therealong at least between a first location for picking up a group of pipe from said pick-up zone and a second location for depositing the group of pipe on a rack supported in said loading position, and said carrier mechanism comprising a plurality of parallel, horizontal, pipe lifting fingers in uniformly spaced, laterally aligned relationship, said fingers being supported from one end thereof as cantilevers by said carrier mechanism at a level spaced therebelow and being oriented to respectively extend axially within a corresponding plurality of pipe positioned in a group as aforesaid in said pick-up zone when the carrier mechanism is in said first location for picking up said plurality of pipe when the carriage is elevated without disturbing their relative orientation and for depositing them on a rack supported in said loading position when said carrier frame is in said second location.

9. Apparatus according to claim 8 including means operable to move said fingers respectively into axial alignment with pipe positioned as aforesaid on said pipe positioning mechanism, and means operable to move said fingers horizontally into a group of pipe so positioned on said positioning mechanism from a location axially spaced therefrom for lifting the pipe when the main carriage is thereupon elevated and for moving the fingers and pipe carried thereby to a rack supported in said loading position for depositing pipe thereon when the carriage is thereupon lowered.

10. Apparatus according to claim 8 in which said pipe positioning mechanism comprises a positioning table providing said horizontal supporting surface, means for rolling pipe one after another onto said surface and along a predetermined path thereon, a series of pipe positioning stops mounted on said table below said surface for vertical movement to project above said surface for interrupting the movement of pipe therealong, said stops being mounted for adjustable movement along said path to vary the center-to-center spacing of pipe respectively positioned thereby, and means operative to move said stops sequentially upwardly above said surface for stopping one pipe after another in spaced relationship determined by adjustment of the spacing of the stops.

11. Apparatus according to claim 8 in which said rack loading mechanism comprises a rack positioning and supporting mechanism, means for moving empty racks one at a time along a first predetermined path to a loading position on said positioning and supporting mechanism, and means for moving loaded racks away from the rack positioning and supporting mechanism along a second predetermined path, said rack positioning and supporting mechanism including vertically reciprocable means for engaging and positioning a rack in said loading position.

References Cited in the file of this patent

UNITED STATES PATENTS

| | | |
|---|---|---|
| 907,971 | Chase et al. | Dec. 29, 1908 |
| 1,376,446 | Lightner et al. | May 3, 1921 |
| 1,457,639 | Straight | June 5, 1923 |
| 1,522,600 | Strickland | Jan. 13, 1925 |
| 1,819,032 | Lehman | Aug. 18, 1931 |
| 1,911,106 | Camerota | May 23, 1933 |
| 2,438,603 | Erhardt | Mar. 30, 1948 |
| 2,457,135 | Deiters | Dec. 28, 1948 |
| 2,469,575 | Ralston et al. | May 10, 1949 |
| 2,644,564 | Bassoff | July 7, 1953 |
| 2,712,875 | Leopold | July 12, 1955 |
| 2,717,089 | Hebert | Sept. 6, 1955 |
| 2,869,739 | Davis | Jan. 20, 1959 |
| 2,985,982 | Smith | May 30, 1961 |

UNITED STATES PATENT OFFICE
CERTIFICATE OF CORRECTION

Patent No. 3,075,656 January 29, 1963

Frank S. Pearne

It is hereby certified that error appears in the above numbered patent requiring correction and that the said Letters Patent should read as corrected below.

Column 11, line 19, after "said", second occurrence, insert -- first --.

Signed and sealed this 27th day of August 1963.

(SEAL)
Attest:

ERNEST W. SWIDER
Attesting Officer

DAVID L. LADD
Commissioner of Patents